Patented Aug. 20, 1935

2,012,080

UNITED STATES PATENT OFFICE 2,012,080

METHOD OF AND APPARATUS FOR SEPARATING AND PURIFYING HELIUM FROM A GASEOUS MIXTURE

William Lane De Baufre, Lincoln, Nebr.

Application November 15, 1933, Serial No. 698,047

20 Claims. (Cl. 62—175.5)

This invention relates to the separation of gaseous mixtures by selective liquefaction and is especially useful in the separation of helium from natural gas but may also be applied to the separation of other highly volatile gases such as hydrogen and neon from mixtures of gases having appreciably higher boiling points.

The primary object of the invention is to secure helium of a higher purity than has heretofore been obtained directly from natural gas by the liquefaction process.

A further object of the invention is to increase the recovery of helium from natural gas and to reduce the losses of helium during the processing to a minimum.

Another object of the invention is to extract from the gas being processed, the refrigerant used for balancing heat leak and other thermodynamic losses in the apparatus.

Another object of the invention is to accomplish the foregoing objectives in an efficient manner by means of apparatus which is readily constructed and easily started and operated.

Figure 1:
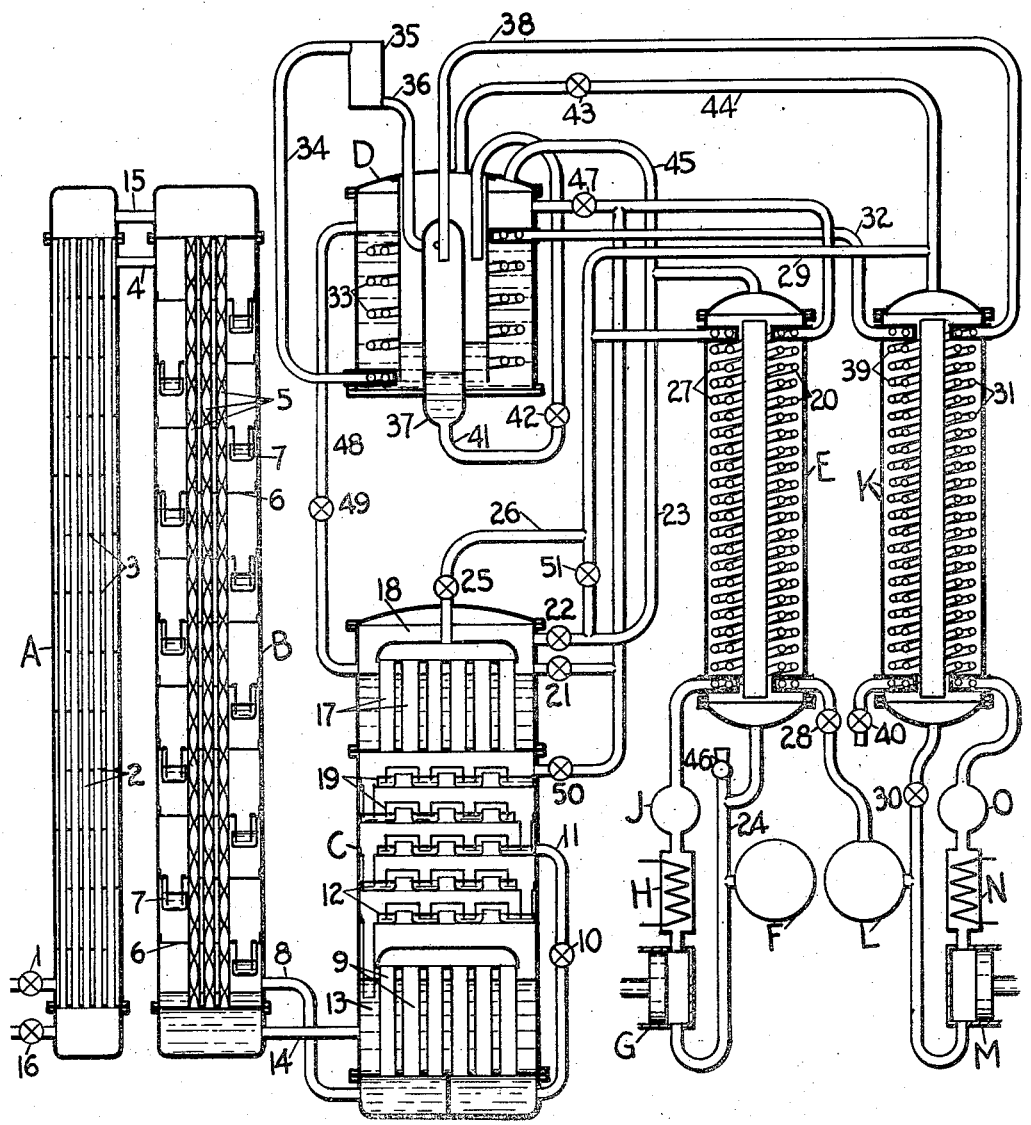
Figure 2:
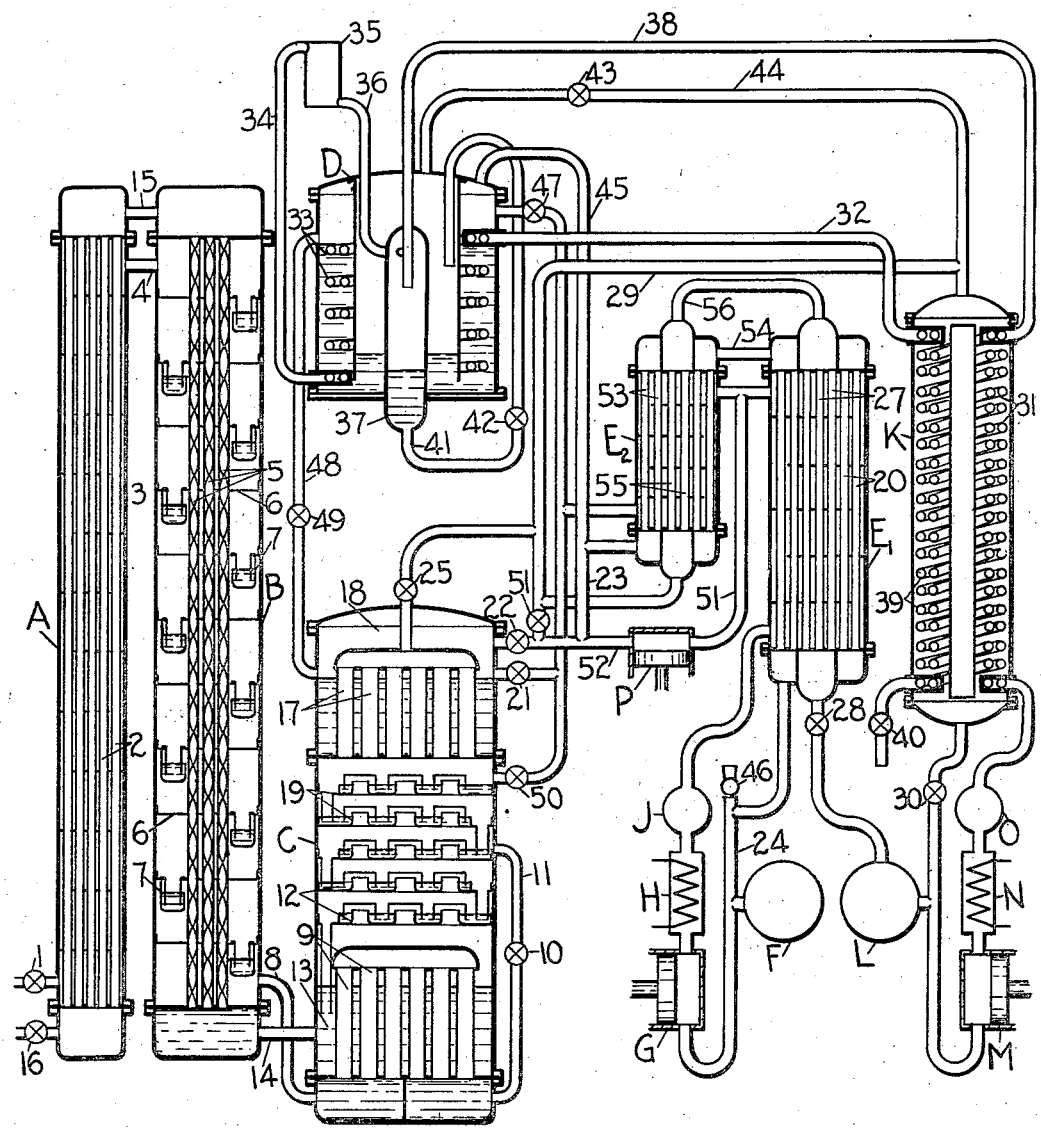

The above objects together with such other advantages as may hereinafter appear or are incident to the invention, are realized by the method and apparatus represented in the accompanying drawings in which Fig. 1 shows diagrammatically one form of said apparatus, and Fig. 2 shows diagrammatically a modified form of said apparatus.

Referring to the drawings, Fig. 1 and Fig. 2, the apparatus comprises:

Interchanger A for cooling the raw gaseous mixture containing helium;

Liquefier B for partly liquefying the constituents of the gaseous mixture other than helium;

Scrubber C for separating raw impure helium gas from the liquefied constituents of the gaseous mixture and for recovering absorbed helium from these liquefied constituents;

Purifier D for liquefying most of the impurities in the raw impure helium gas, separating therefrom helium gas of a high degree of purity, and recovering absorbed helium from the liquefied impurities;

Exchanger E (Fig. 1) for cooling and partly liquefying a compressed gaseous refrigerant; or exchanger $E_1$ and liquefier $E_2$ (Fig. 2) for cooling and partly liquefying a compressed gaseous refrigerant and engine P for expanding the cooled refrigerant;

Gas holder F, compressor G, after-cooler H and chemical purifiers J for the gaseous refrigerant;

Exchanger K for warming the impure helium gas to room temperature and for recooling it after being compressed; and Gas holder L, compressor M, after-cooler N and chemical purifiers O for the impure helium gas.

The purpose of the above listed apparatus is to cool and partly liquefy a raw natural gas containing a small amount of helium, 0.5 to 2 per cent or more, separate the gaseous portion containing most of the helium from the liquefied portion, recover helium in solution in the liquefied portion, and then purify the raw helium gas so obtained. In order to operate such a process at the very low temperatures necessary, low temperature refrigeration must be supplied by means of a suitable refrigerant. The apparatus is arranged to extract a suitable refrigerant from the raw natural gas when the plant is first started and to augment its quantity during operation. Either very high compression of this gaseous refrigerant combined with cooling and simple throttling may be utilized as shown in Fig. 1 or more moderate compression may be employed in combination with an expansion engine as shown in Fig. 2. Otherwise, the apparatus in Fig. 2 is the same as in Fig. 1 and the same description will apply to both figures.

The raw natural gas is first dried and purified of carbon dioxide by chemical means not shown and then enters interchanger A through valve and pipe 1. Within interchanger A, the raw natural gas is cooled nearly to the liquefaction temperature of the main constituents of the raw gaseous mixture by flowing across tubes 2 as deflected by baffles 3. Any very highly volatile hydrocarbons in the natural gas may be partly liquefied in interchanger A. Also, by providing interchanger A in duplicate with the proper arrangement of piping and valves for switching from one interchanger to the other, the preliminary chemical drying mentioned above can be eliminated; but this is aside from the present invention.

The cooled natural gas leaves interchanger A through pipe 4 and enters liquefier B wherein most of the raw gaseous mixture is liquefied by contact with tubes 5. In order to approach phase equilibrium between the liquefied portion of the raw natural gas and the portion remaining in gaseous form, the remaining gaseous portion is caused to bubble through the liquefied portion a number of times by means of baffles 6 and liquid seals 7 as the two portions flow downward through the liquefier. This arrangement also prevents liquid formed at one temperature dropping with little change in composition to a place of much lower temperature where it would solidify and clog the apparatus. The partly liquefied gaseous mixture leaves through pipe 8 and enters the base of scrubber C.

Within scrubber C, the separation of the liquefied portion from the remaining gaseous portion of the raw natural gas is effected and the liquefied portion is subjected to the scrubbing action of a reflux gas in order to reduce the quantity of helium in solution therein. This gas reflux is produced by heat interchange with the gaseous mixture from liquefier B while passing through tubes 9 before being throttled through valve 10 and pipe 11 onto trays 12 within scrubber C. Overflowing from tray to tray, this liquid finally reaches compartment 13 where it surrounds tubes 9. Being under a lower pressure than that of the gaseous mixture within tubes 9, this liquid is also at a lower temperature and absorbs heat from the gaseous mixture before throttling. The resulting vapor bubbles up through the liquid which is flowing down on trays 12, thereby scrubbing out some of the helium absorbed in the liquid. The remaining liquid flows back to liquefier B through pipe 14 and carries with it a smaller amount of absorbed helium than would have been the case if it had not been subjected to this scrubbing action. Consequently, the recovery of helium is increased by reason of the reduced loss of absorbed helium in the returning liquid.

The returning liquid flows up through tubes 5 in liquefier B and is vaporized by heat interchange with the raw gaseous mixture condensing outside of these tubes. In order to provide the best conditions for heat transfer between the two fluids, the remaining liquid is caused to move along with the vaporized portion by means of whirler strips or other construction within tubes 5 or by maintaining the velocity above the critical value below which liquid is not carried along by the vapor. The remaining liquid which has a higher vaporizing temperature as it becomes less in quantity, is moved along to regions of higher and higher temperatures until it is completely vaporized. The resulting gaseous mixture returns from liquefier B through pipe 15 to interchanger A.

Within tubes 2 of interchanger A the returning gaseous mixture is warmed nearly to the temperature of the original raw natural gas entering valve and pipe 1. The returning gaseous mixture leaves interchanger A through pipe and valve 16.

Not only does scrubber C reduce the loss of helium in the returning gaseous mixture, but it also reduces the impurities in the impure helium gas as first separated from the liquefied portion of the original gaseous mixture. This is accomplished by further reducing the temperature of the raw impure helium gas within tubes 17 by heat interchange with a liquid refrigerant surrounding these tubes in vaporizer 18. The resulting liquefied impurities flow down over trays 19 through which the impure helium gas bubbles. The resulting scrubbing action reduces the helium absorbed in the liquefied impurities before they commingle with the liquefied portion of the raw gaseous mixture entering scrubber C through pipe 11.

The above mentioned liquid refrigerant is obtained by compressing a gaseous refrigerant, preferably nitrogen, and then cooling and expanding the same. If the pressure of the compressed gaseous refrigerant is sufficiently high and the temperature to which it is cooled is sufficiently low, a portion of the gaseous refrigerant will be liquefied when the highly compressed and cooled gas is expanded through a throttle valve to a low pressure. Thus, in Fig. 1, the gaseous refrigerant is compressed to 1500 to 3000 lbs. per sq. in. by compressor G. The heat of compression is removed in after-cooler H. The cool compressed gas is passed through chemical purifiers J containing the proper chemical reagents to absorb carbon dioxide and water vapor from the gas. The compressed gas then flows through tubes 20 within exchanger E where it is cooled to a very low temperature. By expanding through throttle valve 21, a portion of the refrigerant is liquefied and accumulates within vaporizer 18 around tubes 17 where it is vaporized by heat interchange with the impure helium gas as previously explained. The vaporized liquid commingles with that portion of the expanded refrigerant which was not liquefied and returns through valve 22 and pipe 23 to the shell of exchanger E. In returning through the shell of exchanger E, the expanded and vaporized refrigerant is warmed by heat interchange with the compressed gaseous refrigerant flowing through tubes 20. The warmed refrigerant then flows through pipe 24 to compressor G. The gas holder F floating on pipe 24 between exchanger E and compressor G provides a supply of refrigerant when starting the plant after a brief shut down and reduces fluctuations in the pressure and flow of refrigerant.

By the use of a reciprocating engine or a turbine for expanding the refrigerant instead of a throttle valve, a moderate pressure of the compressed gaseous refrigerant is sufficient to produce the required low temperature refrigeration. This arrangement is shown in Fig. 2. The gaseous refrigerant is compressed to 400 to 600 lbs. per sq. in. by compressor G. The heat of compression is removed in after-cooler H. The cooled compressed gas is passed through chemical purifiers J containing the proper chemical reagents to absorb carbon dioxide and water vapor from the gas. The compressed gas then flows through the shell of exchanger $E_1$ where it is cooled to a moderately low temperature, say about minus 100 centigrade. Most of the compressed and cooled refrigerant passes through pipe 51 to expansion engine P where it is expanded to a low pressure and thereby further cooled to a very low temperature in doing work. The very cold expanded refrigerant is exhausted through pipe 52 and returns through pipe 23 to liquefier $E_2$ where it passes through tubes 53. From thence, the expanded refrigerant returns through pipe 54 to exchanger $E_1$ and passes through tubes 20 therein where it is warmed nearly to the temperature of the compressed gaseous refrigerant entering this exchanger. The expanded and warmed refrigerant returns through pipe 24 to compressor G, the gas holder F having the same function as previously described.

Part of the compressed and cooled refrigerant leaving the shell of exchanger $E_1$ enters the shell of exchanger $E_2$ and is further cooled therein. When this further cooled refrigerant is expanded through throttle valve 21 to the low pressure within vaporizer 18, a portion of the refrigerant is liquefied and accumulates within vaporizer 18 around tubes 17 where it is vaporized by heat interchange with the impure helium as previously explained. The vaporized liquid commingles with that portion of the throttled refrigerant which was not liquefied, flows through valve 22 and pipe 23, commingles with the very cold expanded refrigerant exhausted from engine P, and returns through tubes 53 in liquefier E₂ and tubes 20 in exchanger E₁ to compressor G.

The impure helium gas within tubes 17 of scrubber C is withdrawn as the raw helium product through valve 25. This raw helium flows through tubes 55 of liquefier E₂, through pipe 56, and then through tubes 27 of exchanger E₁. When the raw impure helium reaches valve 28, it has been warmed nearly to room temperature. It flows through valve 28 and is stored in gas holder L.

Valve 25 must be operated to maintain the proper liquid level surrounding tubes 9 in compartment 13 by controlling the withdrawal of raw helium gas from scrubber C. The rate of withdrawal of gas determines the pressure within scrubber C and this pressure in turn determines the rate at which the liquid in compartment 13 of scrubber C will be forced through liquefier B and interchanger A where it is vaporized and warmed to about room temperature.

The plant can be operated indefinitely in this way, producing raw helium gas containing more or less impurity depending upon the actual operating conditions. It will usually be desired, however, to purify the raw helium gas in the manner which will now be described.

By keeping valve 28 closed and opening valve 30, the raw helium gas is caused to flow through pipe 29 and the shell of exchanger K to gas holder L instead of through tubes 27 in exchanger E. Compressor M is operated to compress the raw impure helium gas to a high pressure, say 2000 lbs. per sq. in. The heat of compression is removed in after-cooler N and the compressed impure helium gas then passes through chemical purifiers O to absorb carbon dioxide and moisture in the impure helium gas. The compressed impure helium gas is passed through tubes 31 within exchanger K in heat interchange with the raw impure helium gas flowing through the shell of exchanger K. By so doing, the cold raw impure helium gas from scrubber C is warmed to about room temperature, compressed and recooled.

The compressed and recooled impure helium gas flows through pipe 32 to coiled tubes 33 immersed in the liquid within purifier D where the final cooling is effected by heat interchange with this liquid. Most of the impurities are liquefied but exist as a mist suspended in the helium gas. This mist filled helium gas passes through pipe 34 to mist collector 35 which contains a number of wire mesh screens for collecting the mist into liquid drops. The helium gas containing these liquid drops then flows through pipe 36 into flask 37, which it enters tangentially in order that the liquid drops will be thrown by centrifugal force against the sides of flask 37. Adhering thereto, the liquefied impurities flow down into the liquid bath at the bottom of the flask. This procedure separates effectively the purified helium gas, say 99 per cent pure, from the liquefied impurities. The purified helium gas leaves flask 37 through the central tube and thence flows through pipe 38 and tubes 39 within exchanger K. The purified helium gas is warmed to approximately room temperature by heat interchange with the impure helium in exchanger K, thus conserving the refrigeration in the cold purified helium gas leaving purifier D. Valve 40 in combination with compressor M controls the pressure of the helium gas being purified, which is an important factor in the purity attained.

The liquefied impurities separated from the purified helium gas in flask 37 leave through pipe 41 and are throttled by valve 42 into the annular compartment surrounding flask 37. These liquefied impurities contain by absorption some helium gas which is largely released by throttling to the low pressure in the compartment surrounding flask 37. Also, some liquid is vaporized by the throttling action. The commingled helium gas released and impurities vaporized by throttling leave this compartment through valve 43 and pipe 44 and then commingle with the impure helium gas in pipe 29 from scrubber C. In this way, the helium gas absorbed in the impurities liquefied in the final purification of the raw impure helium gas is recovered by reprocessing the helium gas released and impurities vaporized by throttling with the raw impure helium gas from scrubber C.

Since the helium gas released by throttling supports part of the total pressure in the annular compartment surrounding flask 37, the partial pressure of the saturated vapor from the vaporization by throttling of the liquefied impurities will be less than the total pressure in this compartment. The temperature of the remaining liquid will correspond to the partial pressure of this saturated vapor rather than to the total gas and vapor pressure. Hence, the remaining liquid will be reduced to a very low temperature. This very low temperature liquid is immediately passed over coiled tubes 33 and by heat interchange reduces the impure helium nearly to the same low temperature before it enters flask 37. As this low temperature is an important factor in the helium purity attained, the above described procedure leads to very high purity of the helium produced.

The heat absorbed by the liquefied impurities from the impure helium within coiled tubes 33 raises the temperature of the liquefied impurities to their vaporization temperature under the total pressure in the outer compartment. The liquefied impurities are then completely vaporized by heat interchange with the impure helium within coiled tubes 33. The resulting vapor leaves purifier D through pipe 45 and commingles with the expanded and vaporized refrigerant from pipe 23, thereby augmenting the refrigerant returning through the shell of exchanger E in Fig. 1 or through tubes 53 and 20 in liquefier E₂ and exchanger E₁ respectively in Fig. 2. The excess refrigerant escapes through pressure relief valve 46.

As the impurities separated from the helium in purifier D consist almost wholly of nitrogen, which is generally associated with helium in natural gas and is the most volatile of the main constituents of the natural gas, the refrigerant is continually enriched with the constituent of the raw natural gas which boils at the lowest temperature under any given pressure with the exception of helium. Also, nitrogen is an inert constituent of the raw natural gas which does not contribute to its heating value. The removal of some nitrogen by the above described method therefore raises the heating value of the processed gas as compared with the raw gaseous mixture. Finally, this process provides a source of nitrogen.

Should it be desired for any of these purposes to increase the amount of nitrogen removed from the raw gaseous mixture, this can be accomplished by decreasing the purity of the raw helium gas withdrawn from scrubber C. The purity of the raw helium gas is a function of its pressure within tubes 17 of scrubber C and the temperature to which it is reduced within these tubes by heat transfer to the liquid refrigerant vaporizing around these tubes. The temperature of the liquid refrigerant vaporizing around tubes 17 corresponds to the pressure within vaporizer 18 as controlled by valve 22. Hence, the removal of nitrogen from the gaseous mixture can be increased in this process by operating either with a lower pressure within scrubber C or with a higher pressure within vaporizer 18. In the former case, valves 16 and 25 are opened slightly more and valve 10 is closed somewhat. In the latter case, valve 22 is closed somewhat (valve 49 being closed).

Valve 47 is provided in order that refrigerant may be throttled into the outer compartment of purifier D, thereby mixing liquid refrigerant with the liquefied impurities therein should a greater cooling effect be desired than furnished by the latter. The commingled liquids will vaporize by heat interchange with the impure helium within coiled tubes 33 and the commingled vapors will leave through pipe 45.

An overflow pipe 48 with valve 49 is provided so that liquid may overflow from purifier D into vaporizer 18 of scrubber C when these compartments are operated under the same pressure with valve 22 wide open. In both figures, purifier D is shown above vaporizer 18; but these figures are diagrammatic and both of these parts of the apparatus may be on the same level or vaporizer 18 may be above purifier D. The overflow through pipe 48 may therefore be from purifier D into vaporizer 18 or from vaporizer 18 into purifier D, depending upon the relative positions of these two parts of the apparatus.

Valve 50 is provided for throttling refrigerant directly into scrubber C rather than into vaporizer 18 at the top of the scrubber in order to obtain a supply of nitrogen for refrigeration purposes when the plant is started for the first time or after a long shut down. By-pass valve 51 is then opened wide for the impure helium, which at such times contains very little helium but consists mainly of nitrogen, to flow through exchanger E of Fig. 1, or through liquefier E₂ and exchanger E₁ of Fig. 2, to compressor G.

The advantages of the above described method of and apparatus for separating and purifying helium from a gaseous mixture will be further explained by describing the cooling down to operating temperatures and the normal operation of the plant. Assume the whole plant to be at room temperature but thoroughly dried out in readiness to start with the chemical purifiers charged and all valves closed.

First, admit sufficient raw gas through valve 1 to fill the system with the gaseous mixture to be processed, opening valves 10, 25 and 51 for the purpose. All atmospheric air within the plant should be discharged through drain valves not shown in the figures. Then start compressor G.

For the plant shown in Fig. 1, valve 50 is opened slightly when the compression pressure reaches the operating value between 1,500 and 3,000 lbs. per sq. in. in order to maintain the compressed gas at this pressure. Throttling through valve 50 to a low pressure within scrubber C will produce an appreciable cooling which becomes accumulative by the action of exchanger E until partial liquefaction of the gaseous mixture results. As this cooling and partial liquefaction proceeds, additional raw gas must be admitted through valve 1 to keep the pressure within the plant above atmospheric pressure.

The liquid produced by cooling and throttling the compressed raw gas will flow down through trays 19 and 12 in scrubber C and will accumulate in compartment 13. Return valve 16 should then be opened slightly to permit the accumulated liquid rising through tubes 5 in liquefier B, thereby vaporizing the liquid in cooling the liquefier to operating temperatures. The cool vapor in flowing through tubes 2 in interchanger A will reduce the interchanger to operating temperatures.

The partial liquefaction of the raw gaseous mixture by cooling in exchanger E and throttling through valve 50 and the subsequent rectification of the raw gaseous mixture entering scrubber C through pipe 11 by the liquid portion in flowing down over trays 19 and 12 while subjected to the reflux vapor produced by vaporization of this liquid in cooling down the scrubber, will divide the raw gaseous mixture within the system into two fractions of different compositions. The liquid fraction which accumulates on trays 19 and 12 and in compartment 13 and returns through liquefier B and interchanger A, will consist mostly of the less volatile constituents of the raw gas. The vapor fraction which leaves scrubber C through valve 25 and returns through exchanger E to compressor G, will consist mostly of the more volatile constituents of the raw gas. As the process continues, the fluid circulated in the refrigeration cycle will become nearly pure nitrogen.

The procedure at starting the plant with a refrigeration cycle employing an expansion engine as shown in Fig. 2 is similar to that for throttle expansion described above for Fig. 1. For Fig. 2, however, the compression pressure will be 400 to 600 lbs. per sq. in. only; and as soon as this pressure is attained, expansion engine P is started and loaded to maintain the pressure constant. Valve 50 is kept closed until liquefier E₂ and exchanger E₁ are cooled to operating temperatures by the cool exhaust gas from engine P. Valve 50 is then opened slightly to permit a mixture of liquid and vapor to enter scrubber C. The same separation of the gaseous mixture into a more volatile vapor fraction and a less volatile liquid fraction will occur by selective liquefaction and rectification as previously described. The refrigerating fluid circulating through compressor G and expansion engine P will thereby be enriched with the more volatile constituents of the raw gaseous mixture while the less volatile constituents will be removed therefrom until the refrigerant consists of nearly pure nitrogen.

When the refrigerant becomes nearly pure nitrogen with either throttle expansion from a very high pressure or engine expansion from a moderate pressure, valve 22 is opened wide and valve 21 is opened slightly in order to throttle the nitrogen refrigerant into vaporizer 18 and build up the liquid level therein. As soon as this has been accomplished, the plant is ready for the production of raw impure helium.

Throttle valve 50 and by-pass valve 51 are now closed and valve 28 is opened in order that the raw impure helium will be withdrawn and stored in gas holder L. Then, valve 1 should be opened wide so that the plant will take the raw natural gas at the pipe-line pressure, or if this is too high, valve 1 may be adjusted to maintain any desired pressure within the plant. Valve 10 should be partly closed to maintain the desired pressure ahead of this valve and to regulate the rate of flow of the raw natural gas if this rate is not determined by the capacity of a compressor for the raw natural gas. Valve 25 should be partly closed in order to raise the pressure within scrubber C and force the liquid accumulating within compartment 13 to flow up through tubes 5 in liquefier B and thence through tubes 2 in interchanger A, return valve 16 being opened to permit the outflow of return processed gas. Valve 16 may be an automatic pressure relief valve with its control chamber connected to scrubber C in order to maintain a constant pressure therein.

When a supply of raw impure helium has been stored in gas holder L, the purification of this raw helium can be started. The liquid bath in the outer compartment of purifier D should first be built up by throttling refrigerant through valve 47. Then valve 30 is opened wide, valve 28 is closed and compressor M is started. When the pressure of the compressed impure helium is built up to the desired value of say 2,000 lbs. per sq. in., valve 40 is opened slightly to withdraw the purified product and keep the pressure at 2,000 lbs. per sq. in. The liquefied impurities collecting within flask 37 are withdrawn by slightly opening valve 42, thus discharging these liquefied impurities into the compartment surrounding flask 37. The liquid level within this compartment is controlled by withdrawing through valve 43 the helium gas released and the liquid vaporized by throttling.

The plant is now in full operation separating helium of high purity with high recovery from the raw gaseous mixture. The returned processed gas is of the same composition as the raw gaseous mixture with the exception that nearly all of the helium has been removed therefrom together with some of the nitrogen. Normal operation is maintained by keeping the various liquid levels nearly constant as indicated on liquid level gages not shown in the figures and by maintaining nearly constant operating pressures by manipulating the various valves as follows:

Valve 1 is opened wide if the gaseous mixture is supplied by a compressor which determines the rate of supply of the gas to be processed or if it is desired to operate at the pipe-line pressure. If desired to operate at less than pipe-line pressure, a pressure reducing valve may be used to maintain the plant operating pressure at any preferred value.

Valve 10 is used to regulate the rate of flow of the gaseous mixture through the plant in case this is not accomplished by a compressor supplying the gaseous mixture thereto. In the latter case, valve 10 is used to regulate the pressure of the raw gaseous mixture within interchanger A and liquefier B.

Valve 16 may be open wide or may be partly closed to maintain any desired return pressure of the processed gaseous mixture within interchanger A and liquefier B and scrubber C. In the latter case, an automatic pressure relief valve is preferred with its control chamber connected so as to maintain a constant pressure within scrubber C.

Valve 25 is operated so as to maintain a nearly constant liquid level in compartment 13 surrounding tubes 9 in the bottom of scrubber C. From an operating standpoint, it is better to think of this valve as regulating the discharge of impure helium gas. When the liquid level falls, the impure helium gas is accumulating and should be discharged by further opening valve 25, and vice versa.

Valve 42 is operated to discharge the liquefied impurities as rapidly as they accumulate within flask 37.

Valve 46 is preferably an automatic pressure relief valve with its control chamber connected so as to maintain a constant pressure within the outer compartment of purifier D.

Valve 43 is operated to maintain a nearly constant liquid level within the inner compartment of purifier D by discharging the helium gas released and the liquid evaporated by throttling as rapidly as this gaseous mixture accumulates in the compartment surrounding flask 37.

Valve 40 is operated to maintain the desired helium purification pressure in co-ordination with compressor M, which must be run at the speed that will compress the impure helium gas available for purification.

Valves 21 and 47 are operated in co-ordination with compressor G (and expansion engine P) so as to maintain nearly constant liquid levels in compartment 18 at the top of scrubber C and in the outer compartment of purifier D respectively. If valve 22 is wide open so that the pressures in these two compartments are substantially the same, valve 49 may also be opened wide. The liquid level in the higher compartment may then be permitted to rise until the liquid overflows into the lower compartment.

By closing valve 49, the pressure within compartment 18 may be raised to and maintained at any desired value by partly closing valve 22. By so doing, any desired reduction within reasonable limits of the nitrogen content of the gaseous mixture processed may be accomplished.

I claim:

1. A method of separating helium from a gaseous mixture, including utilizing a refrigerant separate from said gaseous mixture, partly liquefying the gaseous mixture, throttling the partly liquefied mixture to a lower pressure, separating the liquefied portion therefrom under said lower pressure whereby impure helium gas is obtained, expanding said refrigerant in a separate cycle whereby said refrigerant is cooled to a very low temperature, liquefying impurities in the impure helium gas under said lower pressure by heat interchange with the cooled refrigerant, and separating the remaining impure helium gas from the liquefied impurities.

2. A method of separating helium from a gaseous mixture including utilizing a refrigerant separate from said gaseous mixture, partly liquefying the gaseous mixture, throttling the partly liquefied mixture to a lower pressure, separating the liquified portion therefrom under said lower pressure whereby impure helium gas is obtained, partly vaporizing the separated liquefied portion by heat interchange with the partly liquefied mixture before throttling, bringing the vapor so produced as a reflux gas into contact with the separated liquefied portion whereby helium absorbed therein is taken up by the reflux gas, commingling the reflux gas with the impure helium gas, expanding the refrigerant in a separate cycle whereby the refrigerant is cooled to a very low temperature, liquefying impurities in the commingled reflux gas and impure helium gas under said lower pressure by heat interchange with the cooled refrigerant, and separating the remaining impure helium gas from the liquefied impurities.

3. A method of separating and purifying helium from a gaseous mixture, including partly liquefying the gaseous mixture, separating the liquefied portion therefrom whereby impure helium gas is obtained, liquefying impurities in the impure helium gas, separating the liquefied impurities therefrom whereby purified helium gas is obtained, throttling the liquefied impurities to a lower pressure, subjecting the liquefied impurities to the pressure of the absorbed helium gas released and the liquefied impurities vaporized by throttling only whereby the remaining liquefied impurities are reduced to the temperature corresponding to the partial vapor pressure of the liquefied impurities vaporized by throttling only, and bringing the remaining liquefied impurities at this temperature into heat interchange with the impure helium gas whereby the impure helium gas is reduced nearly to the same temperature.

4. An apparatus for separating helium from a gaseous mixture including means for utilizing a refrigerant separate from said gaseous mixture, means for partly liquefying the gaseous mixture and for separating the liquefied portion therefrom whereby impure helium gas is obtained, means for cooling and expanding the refrigerant whereby the refrigerant is cooled to a very low temperature, means for bringing the cooled refrigerant into heat interchange with the impure helium gas whereby impurities therein are liquefied, means for bringing the liquefied impurities as a reflux liquid into contact with the impure helium gas whereby helium absorbed in the liquefied impurities is removed and commingled with the impure helium gas which is withdrawn from the apparatus, and means for bringing the impure helium gas withdrawn into heat interchange with the refrigerant being cooled whereby the impure helium gas withdrawn is warmed.

5. An apparatus for separating helium from a gaseous mixture by utilizing a refrigerant, including means for partly liquefying the gaseous mixture and for separating the liquefied portion therefrom whereby impure helium gas is obtained, means for bringing the refrigerant into heat interchange with the impure helium gas whereby impurities therein are liquefied, means for bringing the liquefied impurities as a reflux liquid into contact with the impure helium gas whereby helium absorbed in the liquefied impurities is removed and commingled with the impure helium gas which is withdrawn from the apparatus, means for commingling the liquefied impurities with the liquefied portion of the gaseous mixture, means for bringing the commingled liquids into heat interchange with the partly liquefied gaseous mixture whereby the commingled liquids are partly vaporized, means for bringing the vaporized liquids as a reflux gas into contact with the commingled liquids whereby helium absorbed in the commingled liquids is removed and commingled with the reflux gas, and means for commingling the reflux gas with the impure helium gas.

6. An apparatus for separating helium from a gaseous mixture by utilizing a gaseous refrigerant, including a refrigeration system for cycling a gaseous refrigerant through a series of changes in temperature and pressure and thereby partly liquefying said refrigerant, means for bringing the liquefied portion of said refrigerant as a reflux liquid into direct contact with said gaseous mixture, means for subsequently commingling the remaining gaseous portion of said refrigerant with more volatile constituents of said gaseous mixture, means for returning the commingled gases to said refrigeration system and means for removing commingled less volatile constituents of said refrigerant and said gaseous mixture therefrom, whereby less volatile constituents of the refrigerant are replaced by more volatile constituents of the gaseous mixture.

7. An apparatus for separating and purifying helium from a gaseous mixture, including means for partly liquefying the gaseous mixture and for separating the liquefied portion therefrom whereby impure helium gas is obtained, means for liquefying impurities in the impure helium gas and for separating the liquefied impurities therefrom whereby purified helium gas is obtained, means for throttling the separated liquefied impurities and for subjecting them to the pressure of the absorbed helium gas released and the liquid vaporized by throttling only whereby the liquefied impurities are reduced to the temperature corresponding to the partial vapor pressure of the liquid vaporized by throttling only, and means for bringing the liquified impurities at this temperature into heat interchange with the impure helium gas.

8. An apparatus for separating helium from a gaseous mixture including means for utilizing a portion of the gaseous mixture as a refrigerant to cool the apparatus to operating temperatures and means for subjecting the remaining gaseous mixture and the refrigerant to rectification whereby less volatile constituents of the refrigerant are replaced by more volatile constituents of the gaseous mixture.

9. An apparatus for separating helium from a gaseous mixture, including an interchanger for cooling the gaseous mixture, a liquefier for partly liquefying the gaseous mixture wherein the liquefied portion is commingled at intervals with the remaining gaseous portion, means for separating the liquefied portion from the remaining gaseous portion whereby impure helium gas is obtained, and means for returning the liquefied portion through the liquefier and the interchanger whereby the liquefied portion is vaporized and warmed by heat interchange in cooling and partly liquefying the gaseous mixture.

10. An apparatus for separating and purifying helium from a gaseous mixture, including means for partly liquefying the gaseous mixture, and for separating the liquefied portion therefrom whereby impure helium gas is obtained, an exchanger for warming and recooling the impure helium gas by heat interchange, means for compressing the warmed impure helium gas before recooling, means for further cooling the compressed recooled impure helium gas until impurities therein are liquefied, means for separating the liquefied impurities therefrom whereby purified helium gas is obtained, and means for bringing the separated liquefied impurities into heat interchange with the compressed recooled impure helium gas whereby the said further cooling is effected.

11. An apparatus for separating and purifying helium from a gaseous mixture by utilizing a compressed gaseous refrigerant, including means for partly liquefying the gaseous mixture and for separating the liquefied portion therefrom whereby impure helium gas is obtained, means for liquefying impurities in the impure helium gas and for separating the liquefied impurities therefrom whereby purified helium gas is obtained, means for cooling the compressed gaseous refrigerant and for expanding it to a lower pressure, and means for commingling the vaporized impurities and the expanded refrigerant and for warming the resultant mixture by heat interchange with the compressed gaseous refrigerant.

12. An apparatus for separating and purifying helium from a gaseous mixture, including means for partly liquefying the gaseous mixture and for separating the liquefied portion therefrom whereby impure helium gas is obtained, means for liquefying impurities in the impure helium gas and for separating the liquefied impurities therefrom whereby purified helium gas is obtained, means for throttling the liquefied impurities and for separating therefrom the absorbed helium gas released by throttling, and means for commingling the helium gas released by throttling with the impure helium gas whereby helium absorbed in the liquefied impurities is recovered.

13. An apparatus for separating and purifying helium from a gaseous mixture by utilizing a compressed gaseous refrigerant, including means for partly liquefying the gaseous mixture and for separating the liquefied portion therefrom whereby impure helium gas is obtained, means for partly liquefying the compressed gaseous refrigerant, a vaporizer for vaporizing liquefied refrigerant in heat interchange with the impure refrigerant, a purifier for liquefying impurities in the impure helium gas by heat interchange with liquefied refrigerant and for separating the liquefied impurities therefrom whereby purified helium gas is obtained, and means for liquefied refrigerant to overflow either from said vaporizer into said purifier or from said purifier into said vaporizer.

14. An apparatus for separating and purifying helium from a gaseous mixture by utilizing a compressed gaseous refrigerant, including an interchanger for cooling the gaseous mixture, a liquefier for partly liquefying the gaseous mixture, a scrubber for separating the liquefied portion from the remaining impure helium gas, means for returning the liquefied portion through the liquefier and the interchanger whereby the liquefied portion is vaporized and warmed by heat interchange in cooling and partly liquefying the gaseous mixture, means for producing a vapor reflux within the scrubber by partly vaporizing the liquefied portion of the gaseous mixture in heat interchange with the partly liquefied gaseous mixture from the liquefier, an exchanger and expander for cooling and expanding and partly liquefying the compressed gaseous refrigerant, means for producing a liquid reflux within the scrubber by liquefying impurities in the impure helium gas in heat interchange with liquefied refrigerant whereby the liquefied refrigerant is vaporized, means for returning the expanded and the vaporized refrigerant through the exchanger whereby the returning refrigerant is warmed by heat interchange with the compressed gaseous refrigerant, a second exchanger and compressor for warming and compressing and recooling the impure helium gas, a purifier for liquefying impurities in the compressed recooled impure helium gas and for separating the liquefied impurities from the remaining purified helium gas, means for throttling the liquefied impurities containing helium in solution and for subjecting them to the pressure of the helium gas released and the liquid vaporized by throttling only whereby the remaining liquefied impurities are reduced to the temperature corresponding to the partial saturated vapor pressure of the impurities vaporized by throttling only, means for bringing the remaining liquefied impurities at this temperature into heat interchange with the impure helium gas whereby the remaining liquefied impurities are warmed and vaporized, means for conveying the vaporized impurities through the first exchanger whereby the vaporized impurities are warmed, and means of conveying the purified helium gas through the second exchanger whereby the purified helium gas is warmed.

15. An apparatus for separating and purifying helium from a gaseous mixture by utilizing a compressed gaseous refrigerant, including an interchanger for cooling the gaseous mixture, a liquefier for partly liquefying the gaseous mixture, a scrubber for separating the liquefied portion from the remaining impure helium gas, means for returning the liquefied portion through the liquefier and the interchanger whereby the liquefied portion is vaporized and warmed by heat interchange in cooling and partly liquefying the gaseous mixture, means for producing a vapor reflux within the scrubber by partly vaporizing the liquefied portion of the gaseous mixture in heat interchange with the partly liquefied gaseous mixture from the liquefier, an exchanger and expander for cooling and expanding and partly liquefying the compressed gaseous refrigerant, means for producing a liquid reflux within the scrubber by liquefying impurities in the impure helium gas in heat interchange with liquefied refrigerant whereby the liquefied refrigerant is vaporized, means for returning the expanded and the vaporized refrigerant through the exchanger whereby the returning refrigerant is warmed by heat interchange with the compressed gaseous refrigerant, a second exchanger and compressor for warming and compressing and recooling the impure helium, a purifier for liquefying impurities in the compressed recooled impure helium gas and for separating the liquefied impurities from the remaining purified helium gas, means for bringing the liquefied impurities into heat interchange with the impure helium gas whereby the liquefied impurities are warmed and vaporized, means for conveying the vaporized impurities through the first exchanger whereby the vaporized impurities are warmed, and means of conveying the purified helium gas through the second exchanger whereby the purified helium gas is warmed.

16. An apparatus for separating and purifying helium from a gaseous mixture by utilizing a compressed gaseous refrigerant, including an interchanger for cooling the gaseous mixture, a liquefier for partly liquefying the gaseous mixture, a scrubber for separating the liquefied portion from the remaining impure helium gas, means for returning the liquefied portion through the liquefier and the interchanger whereby the liquefied portion is vaporized and warmed by heat interchange in cooling and partly liquefying the gaseous mixture, means for producing a vapor reflux within the scrubber by partly vaporizing the liquefied portion of the gaseous mixture in heat interchange with the partly liquefied gaseous mixture from the liquefier, an exchanger and expander for cooling and expanding and partly liquefying the compressed gaseous refrigerant, means for producing a liquid reflux within the scrubber by liquefying impurities in the impure helium gas in heat interchange with liquefied refrigerant whereby the liquefied refrigerant is vaporized, means for returning the expanded and vaporized refrigerant through the exchanger whereby the returning refrigerant is warmed by heat interchange with the compressed refrigerant, and means for conveying the impure helium gas through the exchanger whereby the impure helium gas is warmed by heat interchange with the compressed refrigerant.

17. An apparatus for separating and purifying helium from a gaseous mixture by utilizing a compressed gaseous refrigerant, including an interchanger for cooling the gaseous mixture, a liquefier for partly liquefying the gaseous mixture, a scrubber for separating the liquefied portion from the remaining impure helium gas, means for returning the liquefied portion through the liquefier and the interchanger whereby the liquefied portion is vaporized and warmed by heat interchange in cooling and partly liquefying the gaseous mixture, means for producing a vapor reflux within the scrubber by partly vaporizing the liquefied portion of the gaseous mixture in heat interchange with the partly liquefied gaseous mixture from the liquefier, an exchanger and expander for cooling and expanding and partly liquefying the compressed gaseous refrigerant, means for producing a liquid reflux within the scrubber by liquefying impurities in the impure helium gas in heat interchange with liquefied refrigerant whereby the liquefied refrigerant is vaporized, means for returning the expanded and the vaporized refrigerant through the exchanger whereby the returning refrigerant is warmed by heat interchange with the compressed gaseous refrigerant.

18. An apparatus for separating helium from a gaseous mixture including a refrigeration system, means for utilizing said gaseous mixture as a refrigerant in said refrigeration system to cool the apparatus to operating temperatures, means for partly liquefying said gaseous mixture in said refrigeration system, a scrubber for subjecting the liquefied portion to said gaseous mixture as a reflux vapor, means for removing the resulting liquid from said scrubber and for returning the remaining vapor to said refrigeration system, whereby less volatile constituents of the gaseous mixture utilized as a refrigerant are replaced by more volatile constituents of the remaining gaseous mixture.

19. An apparatus for separating helium from a gaseous mixture, including a liquefier which has vertically disposed tubes for partly liquefying the gaseous mixture flowing outside said tubes by heat interchange with returning liquefied portion of the gaseous mixture flowing up within said tubes, baffles outside said tubes for directing flow of the gaseous mixture across said tubes, and liquid seals at said baffles whereby the remaining gaseous portion of the gaseous mixture is caused to bubble through the liquefied portion at said baffles as the two portions flow downward through said liquefier.

20. A method of separating helium from a gaseous mixture, including partly liquefying the gaseous mixture, bubbling the remaining gaseous portion through the liquefied portion whereby the liquefied portion approaches phase equilibrium with the remaining gaseous portion, further liquefying the remaining gaseous portion and commingling the resulting liquid with the previously liquefied portion, bubbling the remaining gaseous portion through the commingled liquids whereby the commingled liquids approach phase equilibrium with the remaining gaseous portion, repeating the preceding steps until the remaining gaseous portion consists of impure helium gas, separating the commingled liquids from the impure helium gas, and bringing the commingled liquids into heat interchange with said gaseous mixture whereby said commingled liquids are vaporized in partly liquefying said gaseous mixture.

WILLIAM LANE DE BAUFRE.